No. 776,220. PATENTED NOV. 29, 1904.
H. H. CUTLER.
CONTROLLER FOR ELECTRICAL VEHICLES.
APPLICATION FILED APR. 15, 1903.
NO MODEL. 8 SHEETS—SHEET 1.

No. 776,220. PATENTED NOV. 29, 1904.
H. H. CUTLER.
CONTROLLER FOR ELECTRICAL VEHICLES.
APPLICATION FILED APR. 15, 1903.
NO MODEL. 8 SHEETS—SHEET 3.

No. 776,220. PATENTED NOV. 29, 1904.
H. H. CUTLER.
CONTROLLER FOR ELECTRICAL VEHICLES.
APPLICATION FILED APR. 15, 1903.
NO MODEL. 8 SHEETS—SHEET 4.

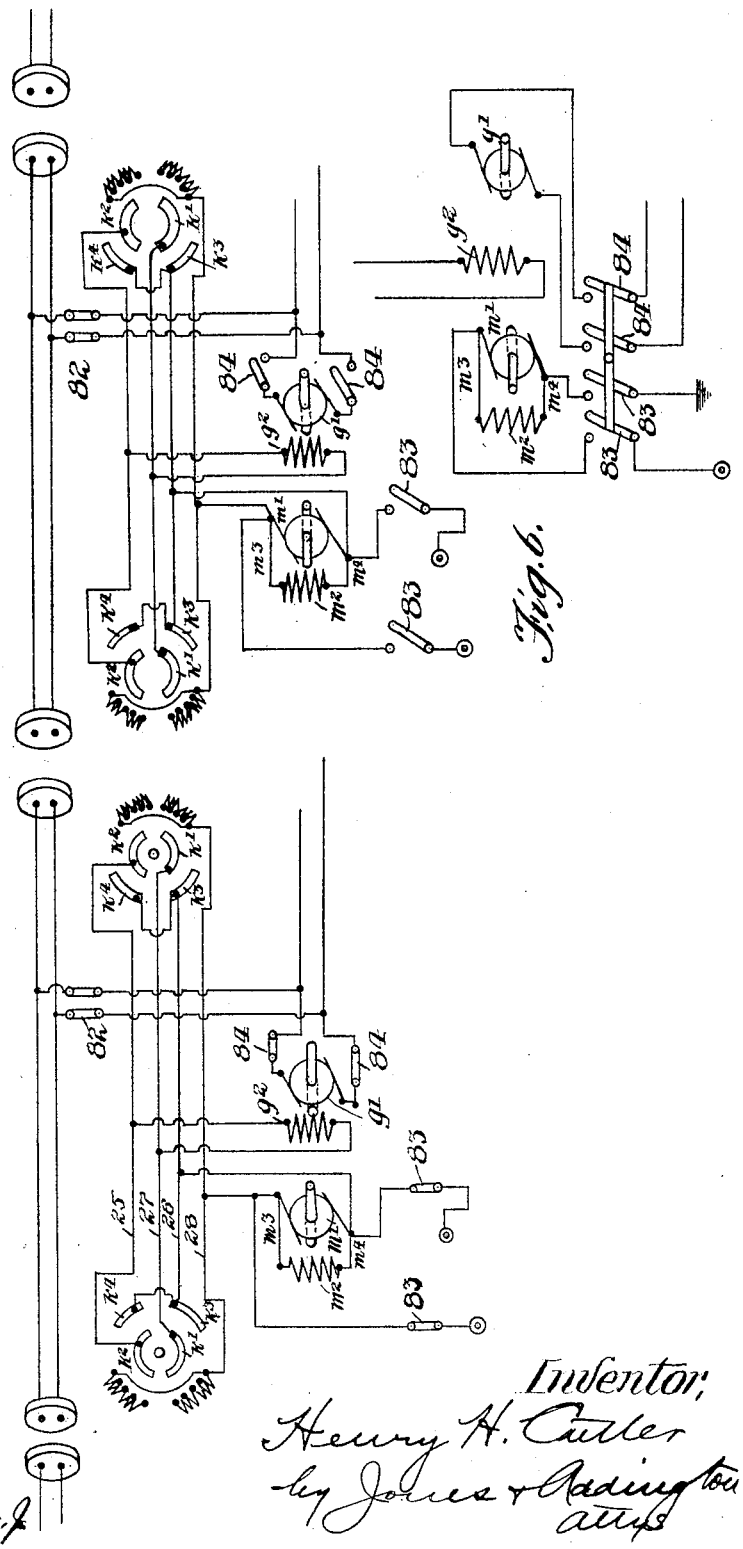

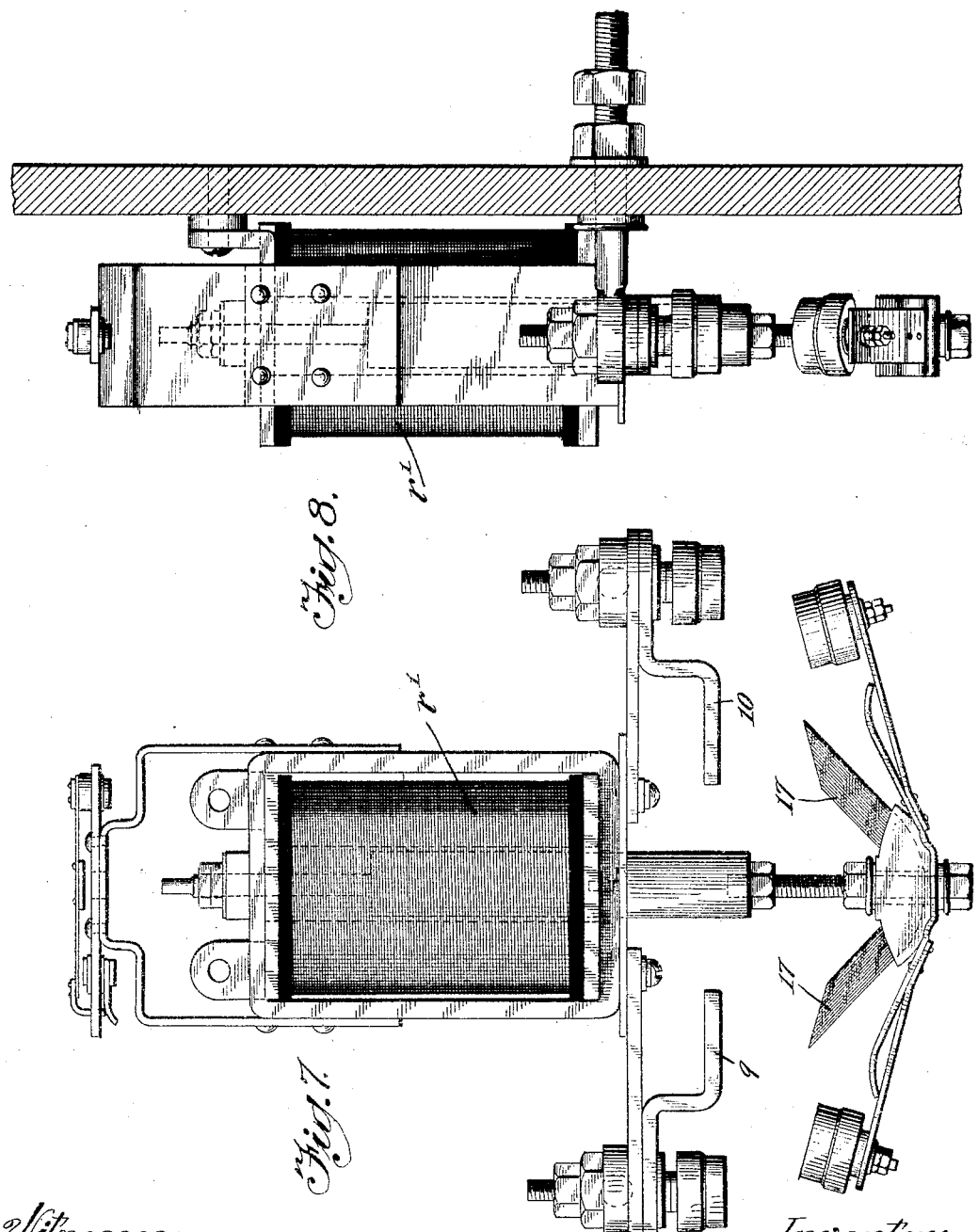

No. 776,220. PATENTED NOV. 29, 1904.
H. H. CUTLER.
CONTROLLER FOR ELECTRICAL VEHICLES.
APPLICATION FILED APR. 15, 1903.
NO MODEL. 8 SHEETS—SHEET 7.
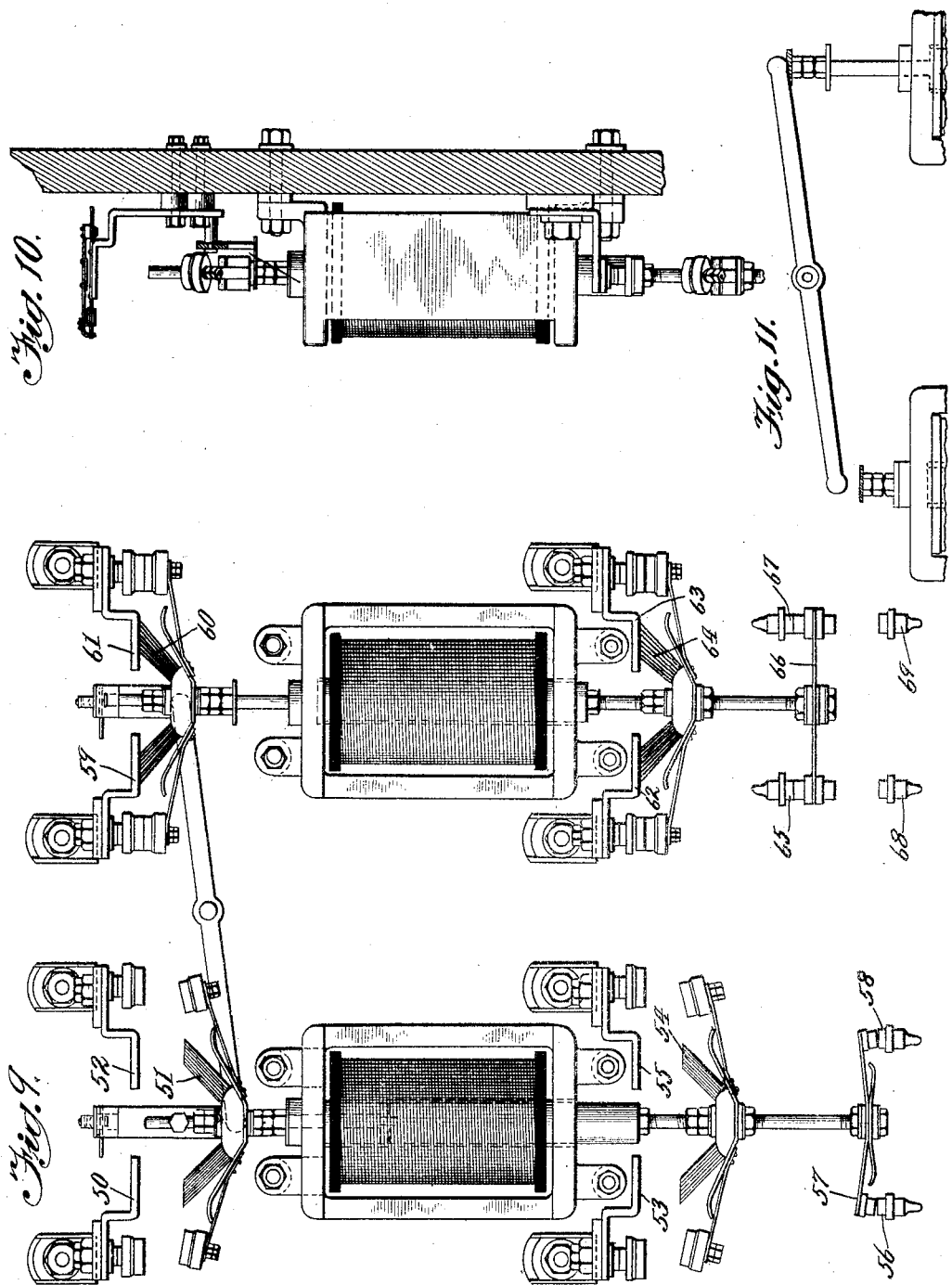

No. 776,220. PATENTED NOV. 29, 1904.
H. H. CUTLER.
CONTROLLER FOR ELECTRICAL VEHICLES.
APPLICATION FILED APR. 15, 1903.
NO MODEL. 8 SHEETS—SHEET 8.

No. 776,220. Patented November 29, 1904.

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

CONTROLLER FOR ELECTRICAL VEHICLES.

SPECIFICATION forming part of Letters Patent No. 776,220, dated November 29, 1904.

Application filed April 15, 1903. Serial No. 152,701. (No model.)

*To all whom it may concern:*

Be it known that I, HENRY H. CUTLER, a citizen of the United States, residing at Milwaukee, in the county of Milwaukee and State of Wisconsin, have invented a certain new and useful Improvement in Controllers for Electrical Vehicles, of which the following is a full, clear, concise, and exact description, reference being had to the accompanying drawings, forming a part of this specification.

My invention relates more particularly to a system for controlling electric motors, my invention having been especially designed for operating trains of cars on the multiple-unit plan, although my invention is equally applicable to the control of a single motor and to the control of a single car. Certain features of my invention are likewise applicable to the manipulation of other electrical instrumentalities as well as electric motors.

I shall first describe my invention with respect to a system adapted to control the operation of a single motor and shall then describe my invention with respect to the series-parallel system of control and a controller which is applicable to a plurality of cars connected in a train. I have illustrated my invention in the accompanying drawings, in which—

Figure 1:
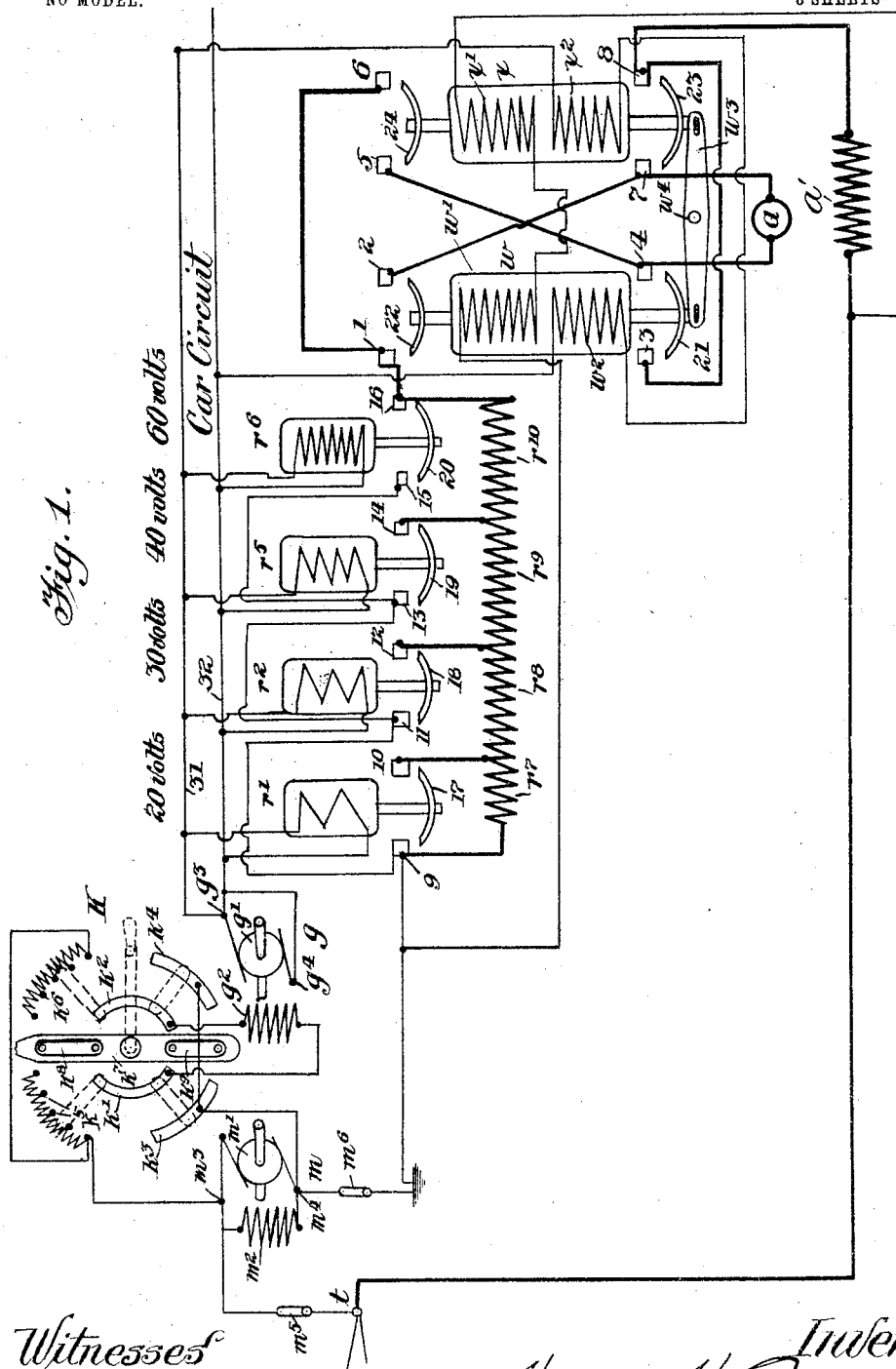
Figure 2:
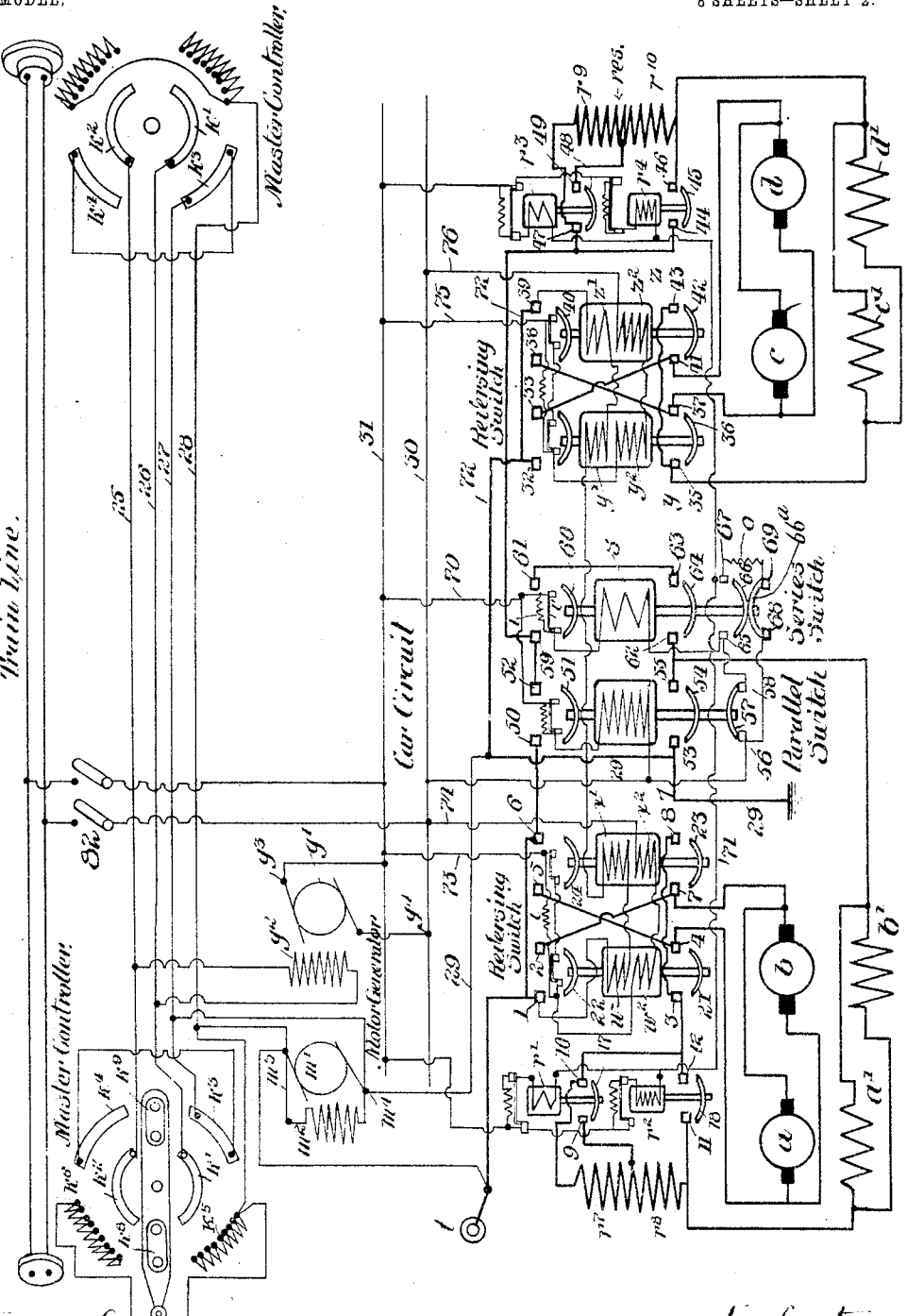
Figure 3:
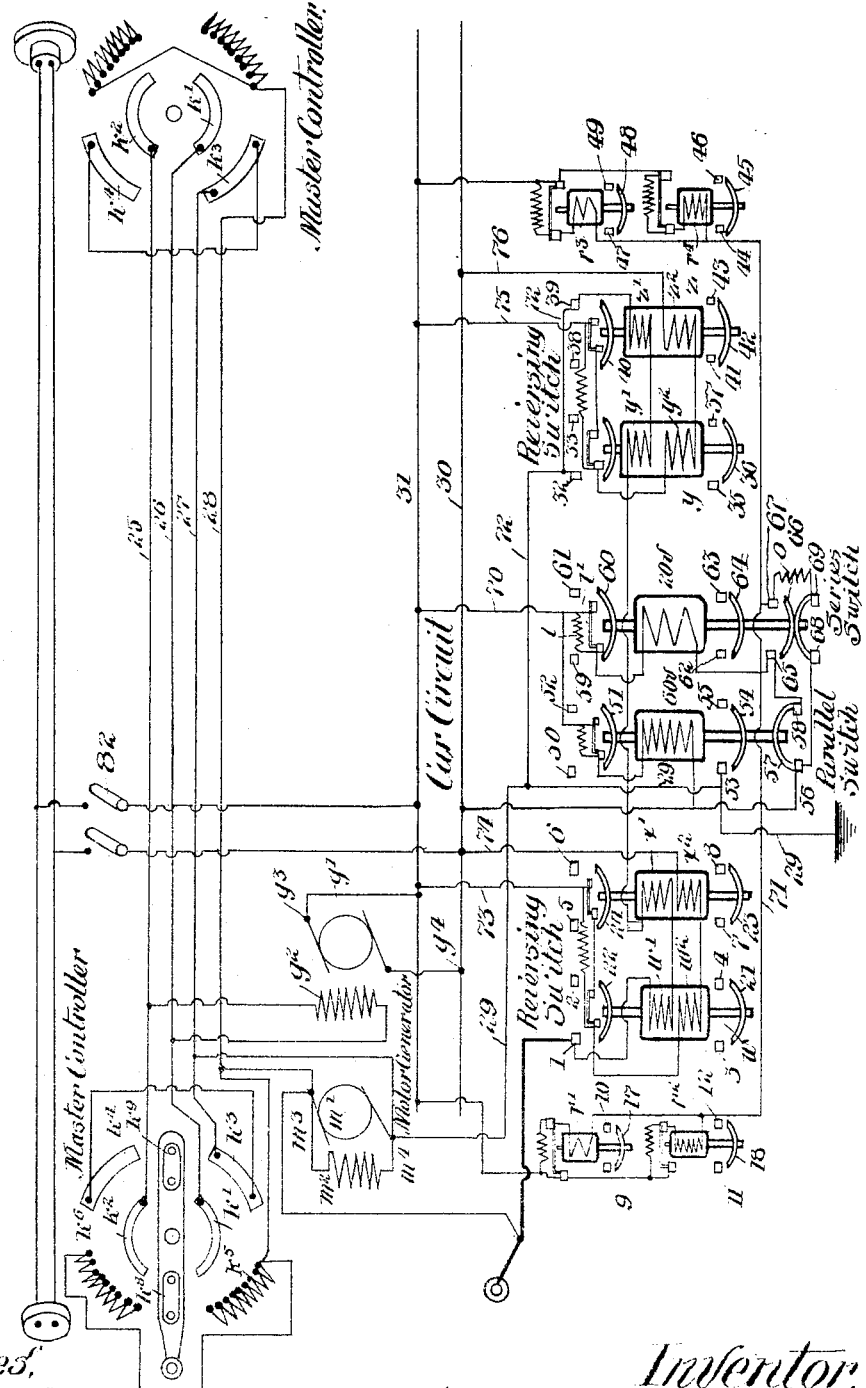
Figure 4:
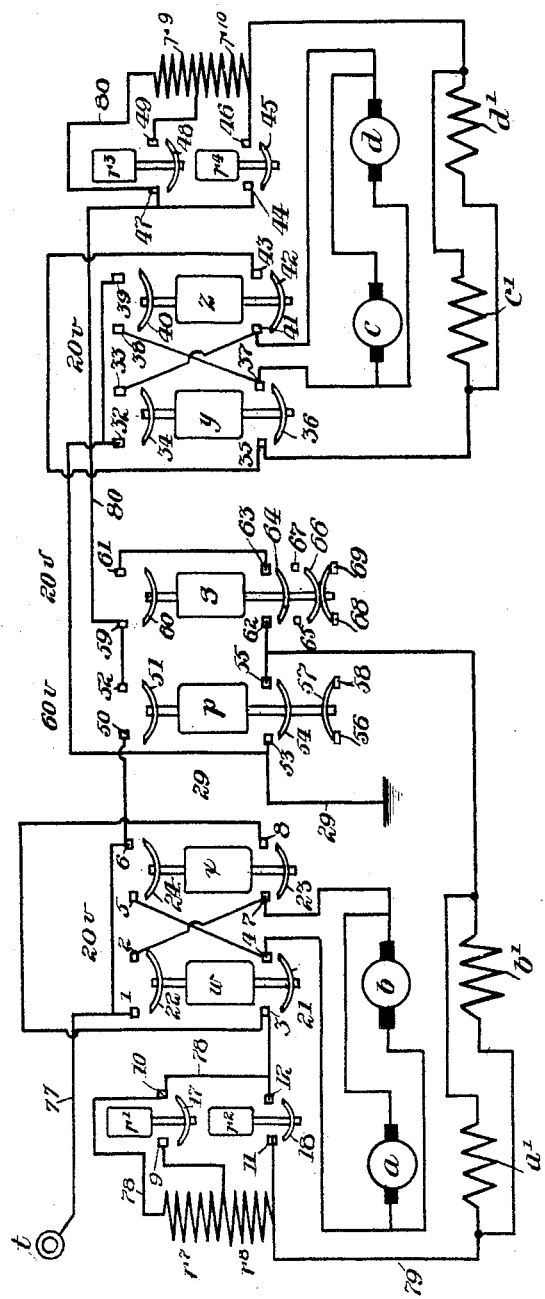
Figure 12:
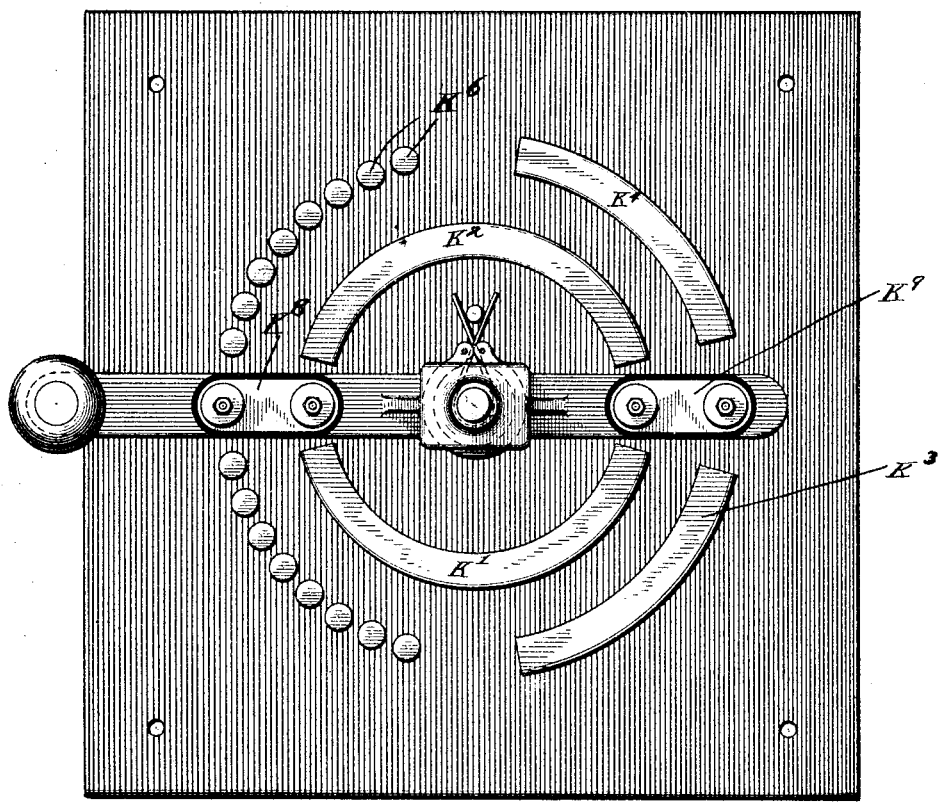
Figure 13:
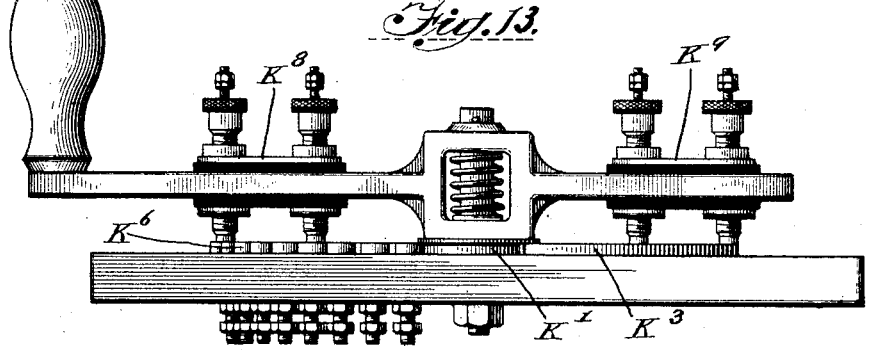

Figure 1 is a diagram showing the circuit arrangement of my invention when applied to the control of a single motor. Fig. 2 is a diagram showing my invention when applied to the driving of a plurality of motors adapted to be connected together in accordance with the series-parallel arrangement. Fig. 3 is a diagram showing the solenoid and other controlling-circuits of the system shown in Fig. 2. Fig. 4 is a diagram showing the power-circuits of the system shown in Fig. 2. Fig. 5 is a diagram showing the controlling-circuits of a plurality of cars adapted to be connected together in a train. Fig. 6 is a diagram showing the circuit arrangements of Fig. 5 in connection with a switch adapted to operate four switch-levers from a single motor. Fig. 7 is a detail view of a form of resistance-controlling solenoid which I preferably employ. Fig. 8 is a side view thereof. Fig. 9 is a detail view of the series-parallel switch mechanism which I preferably employ. Fig. 10 is a side view thereof. Fig. 11 is a detail view showing the interlocking lever and the means whereby one core is capable of a slight movement independently of the other. Fig. 12 is a plan view of the master-controller. Fig. 13 is a side view thereof.

Like characters refer to like parts in the several figures.

In accordance with my invention I provide a circuit which for convenience I shall call a "controlling-circuit." With this circuit a plurality of solenoids is connected, each solenoid controlling a suitable switch which operates contact-points in the power-circuits. These solenoids are arranged to respond to different voltages, so that the solenoids may be operated at will by suitable variation of voltage impressed upon the controlling-circuit. The voltage impressed upon the controlling-circuit may be controlled in any suitable and preferred manner, and my invention, broadly considered, contemplates any equivalent means for accomplishing this variation; but I have worked out my invention more particularly with respect to a particular form of apparatus wherein I employ a motor-generator, the motor part thereof being connected with the supply-circuit and adapted to be driven at an approximately uniform speed and the generator part thereof having its armature connected with the controlling-circuit to supply thereto the current for operating the solenoids. In order to vary the voltage supplied to the controlling-circuit of this armature, I provide means for varying the strength of the field of the generator part of the motor-generator, and a suitable controlling-switch, which I term the "master-controller," is provided for this purpose. It is apparent, of course, that the voltage supplied by the armature of the generator may be varied through the agency of other instrumentalities; but I have adopted this particular structure as peculiarly applicable to commercial and practical conditions. I have developed other structures for producing the variation of voltage, and I have made these structures the subject-matter of separate applications for Letters Patent and have claimed in said applications the specific structures therein illustrated, while including in the present application broad and generic claims contemplating all of these specific modifications of the broad and generic invention.

Referring to Fig. 1, it will be noted that the armature $m'$ and field $m^2$ of the motor $m$ are connected in parallel paths between the trolley $t$ and the wire which extends to ground or rail. The armature $g'$ of the generator is connected with the controlling-circuit to supply current thereto. The field $g^2$ of the generator is connected with the master-controller $k$. This controller comprises segments $k'$ $k^2$, between which the field $g^2$ is connected, and segments $k^3$ $k^4$, connected with the motor-terminal $m^4$ and thence to ground, and consists also of two sets of contact-terminals $k^5$ $k^6$, the end terminals of these sets being connected with the terminal $m^3$ of the motor and thence to the trolley. Suitable resistances are connected between these terminals, and while in practice but a single set of resistances is employed I have illustrated two separate sets for convenience of illustration. A pivoted handle $k^7$ is provided, having brushes $k^8$ and $k^9$. The handle normally rests in the middle position, as illustrated, and when moved in one direction closes the circuit through the field $g^2$ in one direction and when moved in the other direction closes circuit through the field in the opposite direction. The armature of the generator may thus be caused to generate current in either direction at will, and the polarity of the current on the controlling-circuit may thus be reversed as desired. By moving the contact-arm to include more or less resistance in circuit with the field $g^2$ the strength of the field may be varied, and in this manner the voltage developed by the armature $g'$ may be varied at will.

I have illustrated four solenoids $r'$, $r^2$, $r^5$, and $r^6$ connected in parallel between the opposite sides of the controlling-circuit and adapted to respond to different voltages. The solenoid $r'$ when energized lifts the bridge 17 into contact with terminals 9 and 10. Likewise solenoid $r^2$ controls bridge 18 and terminals 11 and 12, solenoid $r^5$ controls bridge 19 and terminals 13 and 14, and solenoid $r^6$ controls bridge 20 and terminals 15 and 16. The solenoids control the sections $r^7$, $r^8$, $r^9$, and $r^{10}$ of the armature resistance. One end of this resistance is connected with ground, and the other end is connected with the trolley, the circuit first passing through the reversing-switch and the motor armature and field, as hereinafter described. As the solenoid $r'$, &c., are successively energized sections of resistance are removed from the armature-circuit.

The reversing-switch comprises two solenoids $w$ and $x$, each having two windings. The windings $w^2$ and $x^2$ are connected in series and are connected between the mains of the controlling-circuit. These windings are so placed that they tend to energize their respective solenoids with like polarity—that is, both tend to make the lower ends of the solenoids north poles, and when the current through the controlling-circuit is reversed both tend to produce south poles at their lower ends.

The windings $w'$ and $x'$ are connected in series and directly between the main supply-circuit—that is between the trolley and ground. These windings are so placed that they tend to produce opposite polarities. For instance, when the winding $w'$ produces a north pole the winding $x'$ will produce a south pole, and vice versa. The windings $w'$ and $w^2$ are of equal magnetizing strength, as are also the windings $x'$ and $x^2$. Accordingly, if windings $w'$ and $w^2$ produce north poles at their lower ends the solenoid $w$ is energized, while at the same time the solenoid $x$ will remain inert, since the winding $x'$ will produce a south pole at its lower end and the winding $x^2$ will produce a north pole. When, however, the polarity of the controlling-circuit is reversed, thus producing a south pole at the lower end of winding $w'$ and a north pole at the lower end of winding $x'$, the conditions will be reversed and solenoid $w$ will be rendered neutral or inert, while the solenoid $x$ will become energized. The cores of the solenoids $w$ and $x$ are interlocked—as, for instance, by means of a link $w^3$, pivoted to $w^4$—so that when one of the cores is raised the other core is necessarily depressed, and vice versa. The core of solenoid $w$ carries bridges 21 and 22, the former adapted to engage the terminals 3 and 4 and the latter to engage terminals 1 and 2. Likewise the core of solenoid $x$ carries bridges 23 and 24, the former adapted to engage terminals 7 and 8 and the latter to engage terminals 5 and 6.

The armature $a$ of the motor is connected between the terminals 4 and 7 of the reversing-switch, and the field $a'$ of the motor is connected directly between the trolley and the terminal 8.

I shall now describe briefly the operation of the system above described.

Assuming the arm of the master-controller to be in the middle position illustrated, the car will of course be at rest. Switches $m^5$ $m^6$ are provided in the motor-circuit, so that the motor may be cut into and out of circuit as desired. These switches $m^5$ and $m^6$ may be the arms of an ordinary two-pole switch; but for the purpose of illustration they are shown as separate switch-arms. With the switches $m^5$ and $m^6$ closed the motorman will move the arm $k^7$ of the master-controller to the right or left, according as he desires to move the car in one direction or the other. Assuming that he moves the arm to carry the brushes $k^8$ to the right, as indicated by long broken lines, and the brush $k^9$ to the left, as similarly indicated, it will be noted that circuit is closed from the trolley side of the line through one of the terminals $k^6$ across the brush to the segment $k^2$, thence through the field $g^2$, the segment $k'$, and through the other brush to the segment $k^3$, thence to the ground. The motor-armature $m'$ being in rotation and the circuit through the generator-field being thus closed, the generator-armature $g'$ develops current. The circuit is first closed through the field $g^2$ with all of the resistance in circuit, and as the arm is moved from segment to segment the resistance is cut out step by step, and the strength of the magnetic field is thus increased in proportion. As the strength of the magnetic field is increased the voltage impressed upon the controlling-circuit is correspondingly increased. When the brush $k^8$ rests upon the first terminal with all of the resistance in circuit with the field, the voltage developed by the armature is, say, ten volts. At the second terminal the voltage is twenty volts, at the third thirty volts, at the fourth forty volts, and at the fifth sixty volts. Solenoids $w$ and $x$ are wound to respond to a pressure of ten volts. The solenoid $r'$ is wound to respond to a pressure of twenty volts. The solenoid $r^2$ responds to thirty volts, the solenoid $r^5$ to forty volts, and the solenoid $r^6$ to sixty volts. It is therefore apparent that by the movement of the arm of the master-controller the solenoids can be successively energized and deënergized by the variation of the voltage impressed upon the controlling-circuit.

The circuit through the motor is normally open at the reversing-switch contacts, and upon the movement of the arm of the master-controller to the first position, thereby impressing ten volts upon the controlling-circuit, one of the solenoids $w$ $x$ of the reversing-switch will be energized, according as the polarity on the controlling-circuit is in one direction or the other. Assuming that the polarity is such as to energize the solenoid $w$, the bridges 21 and 22 are brought into contact with their respective terminals. The motor-circuit may now be traced from the trolley through the field $a'$, thence through contact 8 to the terminal 3, bridge 21, terminal 4, thence through the armature $a$ of the motor to terminal 7, thence through terminal 2, bridge 22, and terminal 1, through all of the sections of the armature resistance to terminal 9, and thence to ground. Circuit is thus closed through the armature with all of the armature resistance in circuit. The solenoid $r'$ is then energized at twenty volts, when the arm is moved to the second terminal, to thereby remove the first section $r^7$ of resistance from the armature-circuit. By moving the arm of the master-controller to the third terminal the voltage is increased to thirty volts and the solenoid $r^2$ is energized to remove from the armature-circuit the section $r^8$ of the resistance. Further movements of the arm of the master-solenoid increase the voltage successively to forty volts and then to sixty volts, and the solenoids $r^5$ and $r^6$ are thus successively energized to remove from circuit their respective sections of the armature resistance. The motor is now running at full speed.

If the armature resistance is a starting resistance, the arm of the controller will be left in the position to maintain all of the resistance removed from the armature-circuit. If, however, the resistance is a regulating resistance, the amount of resistance in the armature-circuit may be adjusted at will, and if it be desired to decrease the speed of the armature the voltage may be reduced to forty volts, in which case the section $r^{10}$ of resistance will be inserted in circuit, and likewise by further reduction of the resistance additional sections of the resistance may be included in the circuit as desired. In order to reduce the voltage, however, it is necessary to move the arm of the controller backward to the first terminal, or the off position, and then move it forward to obtain the desired voltage.

When it is desired to stop the motor, the arm of the master-solenoid is returned to the initial position, thereby opening the circuit through the field $g^2$ of the generator and decreasing the voltage of the controlling-circuit to zero, whereupon all of the solenoids become deënergized and release their cores, which thereupon open the circuits between the bridges and the corresponding terminals.

If during the operation of the motor it is desired to reverse the direction of the movement of the car, the arm of the master-controller would be moved from the position above considered to the position wherein the brush $k^8$ would rest to the left, as shown in short dotted lines, while the brush $k^9$ would rest to the right, as similarly illustrated. The direction of the current through the field $g^2$ would thus be reversed and the voltage on the controlling-circuit likewise be reversed in polarity. The reversal of the voltage in the controlling-circuit would cause all of the solenoids to become deënergized, and the armature resistance would thus be inserted in the armature-circuit, and as the voltage was built up in the opposite direction the solenoid $x$ of the reversing-switch would be energized, thus reversing the direction of the current through the armature and reversing the direction of rotation thereof, and by the movement of the arm of the master-controller the solenoids controlling the armature resistance would be successsively energized to thereby gradually remove the resistance from the armature-circuit.

I shall now described my invention as developed for use in connection with a plurality of motors adapted to be operated in accordance with the series-parallel arrangement.

In Fig. 2 I have illustrated the controlling-circuits and the power-circuits, and for convenience of description I have illustrated in Fig. 3 the controlling-circuits alone, with such portion of the power-circuits as serve to supply current to the controlling-circuits, and in Fig. 4 I have illustrated the power-circuits alone.

Referring more particularly to Figs. 2 and 3, it will be noted that the master-controller described in connection with Fig. 1 is employed; but this controller is duplicated, a controller being provided at each end of the car, whereby the motorman may operate the car from either end.

The system I am about to describe is applicable to a single car adapted to be run individually and is also applicable to a plurality of cars adapted to be run in a train, and in accordance with my invention when the cars are operated in train, the train may be controlled from either end of each car which is provided with the controller equipment. The controller equipment for each car will consist of one two-wire train-line cable with suitable coupling at each end, two master-controllers connected by a four-wire cable, a suitable motor-generator, and a motor-controller proper. The train-line cable would consist of two rubber-covered wires in a suitable casing with a coupling at each end so arranged that the connection of one car to the following car can be made in but one way. The wires will be run from one end of the car symmetrically without crossing, so that when the car is turned around this train-line is reversed, and the car will always run in the proper direction.

For a satisfactory operation of the system it is necessary that the switch-lever of the master-controller remain in the "off" position or be entirely removed when the operator leaves the master-controller. A master-controller will be placed at each end of each car in a position convenient to the operator and will be connected by a four-wire cable in a symmetrical manner, as here shown in the drawings, so that the car will travel in opposite directions for the same motion of the controller-lever. For example, if moving the master-lever to the right causes the car to travel in the forward direction with respect to the operator at that end of the car the throwing of the master-controller to the right on the controller at the other end of the car must make the car travel in the opposite direction or in a forward direction with respect to the operator when standing at said opposite end of the car.

The motor-generator preferably consists of a shunt-motor and a shunt-generator electrically independent, both mounted on a common shaft. When the car is part of the entire train and the entire train is not controlled from the particular car in question, circuit at both master-controllers of the car will always be open, and a switch is provided between each controlling-circuit and the train-line, which switch must be closed when it is desired to control the motors of said car from another car.

I shall now describe my invention with particular reference to the circuits as illustrated in the drawings; but it will be understood that my invention is susceptible of various modifications without departing from the spirit of the invention. The master-controller is the same in construction and operation as that shown in Fig. 1, except that the parts are duplicated, so that a master-controller is provided at each end of the car. I have indicated the parts of these controllers by the same reference-characters employed in Fig. 1. The master-controllers are joined together by means of four wires 25, 26, 27, and 28, these wires being preferably formed into a cable in practice. The wires 25 and 26 unite the segments $k^2$ and $k'$, respectively. The wire 27 unites the segments $k^3$ $k^4$, and the wire 28 unites the resistances of the two controllers. The field $g^2$ of the generator is connected between the conductors 25 and 26, and the field $m^2$ and armature $m'$ of the motor are connected between the trolley $t$ on the one side and the conductor 29 on the other side, the conductor 29 extending to ground. The conductors 27 and 28 are connected with the opposite sides of the supply-circuit—that is, the conductor 28 is connected with the trolley and the conductor 27 is connected with ground. The armature $g'$ of the generator is connected with the opposite conductors 30 and 31 of the controlling-circuit. On the motor side of the motor-generator current will flow from trolley $t$ to terminal $m^3$, thence through the armature and field in parallel and by conductor 29 to ground. If the master-controller is thrown to the right, so that brush $k^8$ engages terminals $k^6$ and brush $k^9$ engages segment $k^3$, then current will flow from trolley to conductor 28, thence to terminals $k^6$, brush $k^8$, segment $k^2$, through field $g^2$, thence to segment $k'$, brush $k^9$, segment $k^3$ to ground. The current then passes through the field of the generator in one direction. If the arm of the master-controller be moved to the left, the current through the field will be reversed. By varying the amount of resistance in series with the field, as heretofore described, the voltage delivered at the controlling-circuit by the generator-armature may be varied at will.

I have considered my invention in connection with four motors, the motors being connected in two sets. Instead of employing four motors thus connected in two sets I may employ two single motors. As illustrated, the armatures $a$ $b$ of two of the motors are connected in parallel, while the fields $a'$ $b'$ of these motors are likewise connected in parallel. In similar manner the motors $c$ $d$ are connected in parallel, and likewise the fields $c'$ $d'$ are connected in parallel. The solenoids $r'\ r^2$ control the sections $r^7\ r^8$ of the armature resistance of the motors $a\ b$ in a manner similar to that described in connection with Fig. 1, and I have indicated similar parts by reference-letters similar to those employed in connection with Fig. 1.

The reversing-switch shown upon the left in connection with motors $a\ b$ is the same as that illustrated in Fig. 1, and the same reference-letters have been employed for indicating like parts. The reversing-switch shown upon the right controls the motors $c\ d$, the solenoid $y$ serving to direct current through the motor-armature in one direction, while the solenoid $z$ directs current in the opposite direction. This reversing-switch is the same in construction as that shown upon the left, and the brushes and coacting terminals are identified by numerals which appear upon the drawings. The solenoids $r^3\ r^4$, shown upon the right, are similar in construction and operation to the solenoids $r'\ r^2$, shown upon the left, and similarly control the armature resistance for the motors $c\ d$. The bridges and terminals of these solenoids have been identified by suitable numerals.

The series-parallel switches comprise two separate solenoids $p$ and $s$, solenoid $p$ controlling the parallel contacts and solenoid $s$ controlling the series contacts. The terminals and bridges controlled by these solenoids have been identified in the drawings by suitable numerals.

I shall now trace the circuits through the several solenoids. The conductor 70 extends from one side of the controlling-circuit through a resistance coil or lamp $l$, resting normally short-circuited by a contact-spring $l'$. When the solenoid is energized, the upper end of the core strikes the spring $l'$ and raises the same, thereby opening the short circuit and including the resistance $l$ in the circuit in series. This resistance is for the purpose of protecting the winding against the flow of an excessive current when the voltage increases above that which is designed to energize the solenoid in question. After passing through this short-circuiting switch the circuit extends through the winding of a solenoid $s$, thence to terminals 65 and 58. When solenoid $s$ is energized, solenoid $p$ is deënergized, and accordingly the bridge 57 rests upon terminals 56 and 58. The circuit may be traced from terminal 58, through bridge 57 and terminal 56, to the opposite side of the controlling-circuit. When solenoid $s$ is energized, circuit can be traced from limb 31 of the controlling-circuit, through solenoids $r'$ and $r^2$, thence by conductor 71 to terminal 67, bridge 66, terminal 65, terminal 58, bridge 57, and terminal 56 to the opposite limb 30 of the controlling-circuit. Circuit can also be traced from limb 31 of the controlling-circuit, through solenoids $r^3$ and $r^4$ to terminal 67 and thence to the opposite limb 30 of the controlling-circuit through the path above outlined. The circuit through solenoid $p$ may be traced from conductor 70, through winding $p$, directly to the conductor 30. The windings $w'$, $x'$, $y'$, and $z'$ of the reversing-switches may be traced from trolley $t$ through said windings in the order named, thence by conductor 72 to conductor 29 to ground. The circuit through windings $w^2$ and $x^2$ may be traced from limb 31 of the controlling-circuit, through conductor 73, windings $w^2\ x^2$, and conductor 74 to the opposite side of the controlling-circuit. Likewise circuit may be traced from limb 31, through conductor 75, windings $y^2\ z^2$, conductor 76 to limb 30 of the controlling-circuit.

I shall now trace the circuits of the various solenoids as the car is started. Assuming that the car is at rest and it be desired to start the same, the arm of the master-controller is moved in one direction or the other, according to the direction in which it is desired to move the car, and the field $g^2$ of the generator is energized to thereby cause the armature $g'$ to generate current in the desired direction. As soon as the voltage across the controlling-circuit has risen to twenty volts solenoid-switches $w$ and $y$ will act, while solenoid-switches $x$ and $z$ will remain inert. At the instant of closing solenoid $w$ will open the small short-circuiting switch shown at the top thereof, and the resistance $l$ will then be introduced into series with the winding of the solenoid to protect it when the voltage of the controlling-circuit has risen further. Solenoid $y$ likewise opens the short-circuiting switch mounted upon the top thereof, and the resistance $l$ will then be included in circuit with the winding of said solenoid. When the voltage of the controlling-circuit has reached twenty volts, solenoid $s$ is also energized, and current for this solenoid will flow from conductor 31 through conductor 70, winding $s$, terminal 65, contacts 58 57 56 to the opposite side of controlling-circuit. Solenoid $s$ when energized likewise opens a short-circuiting switch which includes a resistance $l$ in circuit therewith to protect the winding against further increase of the potential. Solenoid $s$ when energized moves bridge 66 into contact with terminals 65 and 67 and the circuits through the solenoids $r'$, $r^2$, $r^3$, and $r^4$ are thus completed. The circuit through the solenoids $r'\ r^2$ has been heretofore traced, as has also the circuit through solenoids $r^3\ r^4$. The increase of the voltage on the controlling-circuit from twenty to thirty volts will give solenoids $r'$ and $r^3$ sufficient current to energize the same, and a portion of the armature resistance will then be removed from circuit. These solenoids likewise operate short-circuiting switches, which include resistances in circuit with the windings to protect the same. A further increase of the voltage to forty volts will operate the solenoids $r^2$ and $r^4$, thus removing the remainder of the starting resistances from circuit. The cores of the solenoids of the reversing-switches are interlocked, as heretofore described in connection with Fig. 1, so that when one of the solenoids is energized the other is deënergized. With the motors thus operating in series with all of the resistance removed from circuit the voltage is increased to sixty volts, at which voltage the solenoid $p$ is energized. The cores of solenoids $p$ and $s$ are interlocked, but a freedom of movement is permitted, so that when solenoid $p$ is energized the bridge 57 is lifted from contacts 56 and 58, thereby opening the circuit through solenoid $s$ and deënergizing the same. The deënergizing of solenoid $s$ permits bridge 66 to drop and the circuits through the solenoids $r'$, $r^2$, $r^3$, and $r^4$ are opened, thus deënergizing said solenoids and cutting the armature resistances into circuit. The bridge $66^a$ makes contact with terminals 68 and 69, and the circuit through solenoids $r'$, $r^2$, $r^3$, and $r^4$ is now closed, with the resistance $o$ in circuit therewith. The resistance is such that these solenoids will not receive power enough to lift with the voltage of the controlling-circuit at sixty volts. It is accordingly necessary to increase the voltage of the controlling-circuit further to cut the motor-armature resistance out of circuit. Accordingly when the voltage of the controlling-circuit has been raised to eighty volts solenoids $r'$ and $r^3$ will be energized and will cut out their sections of resistance, and when the voltage of the controlling-circuit has been raised to one hundred volts solenoids $r^2$ and $r^4$ will be energized. If the master-controller is moved in the opposite direction, the polarity of the generator-terminals is reversed, so that current will flow through the controlling-circuit in the opposite direction to that in which it previously flowed. The movement of the arm of the master-controller from one side to the other opens the circuit through the field $g^2$, and the voltage of the controlling-circuit then falls to zero and then rises in the opposite direction. As the voltage falls the solenoids are all deënergized and the switch-contacts are accordingly separated. When the voltage in the opposite direction has increased to twenty volts, solenoids $w$ and $y$ will become deënergized, due to the fact that their respective windings will neutralize each other, and the solenoids $x$ and $z$ will become energized, thus reversing the direction of the currents through the armatures of the motors. The deënergizing of solenoids $w$ and $y$ and the energizing of solenoids $x$ and $z$ take place at the same instant, and as the two cores or plungers are mechanically interlocked solenoids $x$ and $z$ will lift and close their circuits the instant solenoids $w$ and $y$ are deënergized and open their circuits.

The paths for the operating-currents of the motors are as follows and may be traced more readily in connection with Fig. 4: Assuming that solenoids $w$ and $y$ have been energized and that solenoid $s$ has also been energized, current will flow from trolley $t$ through conductor 77 to terminal 1, thence through bridge 22 to terminal 2, terminal 7, through the armatures $b$ and $a$ to terminal 4, bridge 21, terminal 3, conductor 78, thence through resistance-coils $r^7$ $r^8$ to conductor 79, thence through the fields $a'$ $b'$ to terminal 62, bridge 64, terminal 63, contacts 61 60 59, conductor 80, resistance-coils $r^{10}$ $r^9$, field-windings $d'$ $c'$, contacts 35 36 37, armatures $c$ $d$, terminals 41 33 34 32, thence to conductor 29 and ground. The armatures and fields are thus connected in series. If solenoids $x$ and $z$ were energized instead of solenoids $w$ and $y$, the circuit would be the same, except that the current would flow through the armatures in the opposite directions, thus reversing the speed of rotation. As solenoids $r'$ $r^3$ and $r^2$ $r^4$ are energized, the armature resistances are removed from circuit to permit the armatures to increase in speed. Upon further increase of voltage the solenoid $p$ is energized and the solenoid $s$ is deënergized, and the motors are thus connected in parallel relation. Circuit through the motors $a$ and $b$ may be traced from trolley $t$ through contacts 1 22 2 and terminal 7, through armature $b$ and armature $a$, thence through contacts 4, 21, and 3, conductor 78, the armature resistance $r^7$ $r^8$, fields $a'$ $b'$, contacts 55, 54, and 53 to ground. Circuit through motors $c$ and $d$ may be traced from trolley $t$ through conductor 77, contacts 50 51 52, terminal 59, conductor 80, resistances $r^9$ $r^{10}$, fields $d'$ and $c'$, contacts 35 36 37, armatures $c$ $d$, terminal 41, contacts 33, 34, and 32, and conductor 29 to ground.

In Fig. 5 I have illustrated a plurality of controlling-circuits. I have shown two car equipments exclusive of the electromagnetic windings and the instrumentalities controlled thereby. Upon the left I have shown the motor-generator and the two master-controllers of the car, one controller being situated at each end of the car. The opposite limbs of the controlling-circuit are connected with the opposite limbs of the train-circuit, which extends from car to car. A switch 82 is provided for disconnecting the controlling-circuit from the train-circuit as desired. Likewise upon the left I have shown a second car equipment, comprising motor-generator and a pair of master-controllers, one situated at each end of the car. The controlling-circuit of this motor-generator is likewise connected with the train-circuit and a switch 82 is interposed in this connecting portion of the circuit. Switches are also provided in the circuit which connects the motor part of the motor-generator with the main supply-circuit, and switches are also provided in the circuit of the armature of the generator part of the motor-generator. Thus switches 83 83 are provided in connection with the motor part and switches 84 84 in connection with the generator part. In Fig. 5 I have illustrated these as separate switch-levers; but in practice the switch-levers may be connected with a single operating-handle, as shown in Fig. 6, in which case all of the levers 83 84 may be operated in unison.

The car upon which the operator stands will have the switches 83 84 closed, while the other cars of the system should have the switches of the system 83 84 open. All of the motor-generators except that upon the car where the operator stands are thus thrown out of operation. The switch 82 should be closed in each instance where it is desired to operate the motors upon the car.

In Fig. 5 the operator is supposed to be upon the car shown to the left, and in this case the motor-generator of this car will supply current to the controlling-circuits of all of the cars of the train and the motor-generator upon all of the other cars will be thrown out of service. The armature of the motor-generator upon the operator's car will thus supply current to the controlling-circuits of all of the cars of the train, and the actuation of the master-controller upon this particular car will vary the voltage and the polarity on all of the controlling-circuits, so that the motors of all of the cars of the train will be controlled in unison.

Any suitable form of solenoid and associated contacts may be employed, and I have shown in Figs. 7 and 8 a form of solenoid-switch which I preferably employ. The winding $r'$ is surrounded with the usual iron-clad shroud and the movable core carries the contact-brush 17, adapted to engage the contacts 9 10. Supplemental arcing contacts of carbon are associated with the principal contacts in a well-known manner. Upon the top of the solenoid the switch is provided which actuates the extra resistance adapted to be included in circuit with the solenoid.

As shown in Figs. 9 and 10, the solenoids of the series-parallel switch are similar in construction to the resistance-controlling solenoid and are adapted to actuate similar switch-brushes to close the contacts. Above the solenoids are suitably mounted the switches which control the resistances which are adapted to be cut into the circuit of the solenoid-windings, and brushes are likewise carried at the upper ends of the cores of the solenoids which serve to make contact with the upper contact-terminals. In order that but one of the cores may occupy an elevated position at a time, an interlocking lever extends between the two cores and, as shown in Fig. 11, there is a slight lost motion permitted between the ends of the interlocking lever and the coacting projections carried upon the cores of the solenoids, so that the parallel solenoid is permitted to raise a short distance to open the circuit through the series solenoid, as hereinbefore explained.

As shown in Figs. 12 and 13, the operating handle or lever of the master-controller is provided with a spring which serves to carry the lever to the initial or off position when the lever is released by the hand of the operator. The spring, as illustrated, consists of a coil having projecting ends engaging a pin whereby movement of the operating-lever in either direction places the spring under tension.

It is of course understood that the system which has herein been described may be applied to control electric motors or other instrumentalities connected in either an alternating-current power-circuit or a direct-current power-circuit.

Having described my invention, what I claim as new, and desire to secure by Letters Patent, is—

1. The combination with a suitable controlling-circuit, of a plurality of electromagnetic windings connected therewith and adapted to respond to variation of voltage, and means for varying at will the voltage impressed upon said controlling-circuit without thereby altering the resistance of said controlling-circuit.

2. The combination with a suitable controlling-circuit, of a plurality of electromagnetic windings connected therewith and adapted to respond to variations of voltage, means for varying at will the voltage impressed upon said controlling-circuit without thereby altering the internal resistance of said circuit, and means operated by said windings to control the current upon a suitable supply-circuit.

3. The combination with a suitable controlling-circuit, of a plurality of electromagnetic windings connected in parallel between the opposite mains of said circuit, and adapted to respectively respond to variation of voltage, and a controller for varying the voltage impressed upon said controlling-circuit without thereby altering the resistance of said controlling-circuit.

4. The combination with a suitable controlling-circuit, of means for varying at will the voltage impressed thereon without thereby altering the resistance of said controlling-circuit, a plurality of electromagnetic windings connected in parallel between the limbs of said controlling-circuit and responding to variation of voltage, and suitable instrumentalities controlled by said electromagnetic windings.

5. The combination with a suitable controlling-circuit, of means for varying at will the voltage impressed thereon without thereby altering the resistance of said controlling-circuit, a plurality of electromagnetic windings associated therewith and responding to variation of voltage, and the elements of an electric-motor controller adapted to be controlled by said electromagnetic windings.

6. The combination with a suitable controlling-circuit, of means for varying at will the voltage impressed thereon without thereby altering the resistance of said controlling-circuit, a plurality of electromagnetic windings connected in parallel with said controlling-circuit and responding to variations of voltage, and the elements of an electric-motor controller arranged to be actuated by said electromagnetic windings.

7. The combination with a suitable controlling-circuit, of means for varying at will the voltage impressed thereon without thereby altering the resistance of said controlling-circuit, a plurality of electromagnetic windings connected with said circuit and responding to variation of voltage, and an armature resistance controlled by said electromagnetic windings.

8. The combination with a suitable controlling-circuit, of a plurality of electromagnetic windings connected therewith in parallel and adapted to respond to variations of voltage, and a suitable source of current-supply having means for varying at will the voltage impressed thereby, the voltage impressed by said source being substantially unaffected by the internal resistance of said circuit.

9. The combination with a suitable controlling-circuit, of a plurality of electromagnetic windings connected therewith in parallel and adapted to respond to variations of voltage, a suitable source of current-supply having means for varying at will the voltage impressed thereby, the voltage impressed by said source being substantially unaffected by the internal resistance of said circuit, and suitable instrumentalities controlled by said windings.

10. The combination with a suitable controlling-circuit, of a plurality of electromagnetic windings connected therewith in parallel and adapted to respond to variations of voltage, a suitable source of current-supply having means for varying at will the voltage impressed thereby, the voltage impressed by said source being substantially unaffected by the internal resistance of said circuit, and the elements of an electric-motor controller arranged to be controlled by said windings.

11. The combination with a controlling-circuit, of a plurality of electromagnetic windings constantly connected therewith in parallel and adapted to respond to variations in voltage, and means for varying the voltage impressed upon said circuit.

12. The combination with a controlling-circuit, of a plurality of electromagnetic windings constantly connected therewith in parallel and adapted to respond to variations in voltage, means for varying the voltage impressed upon said circuit, and suitable instrumentalities controlled by said windings.

13. The combination with a controlling-circuit, of a plurality of electromagnetic windings constantly connected therewith in parallel and adapted to respond to variations in voltage, means for varying the voltage impressed upon said circuit, and the elements of an electric-motor controller adapted to be controlled by said electromagnetic windings.

14. The combination with a suitable controlling-circuit, of a plurality of electromagnetic windings connected therewith in parallel, means for altering the voltage and direction of the current upon said circuit to operate said windings selectively.

15. The combination with a suitable controlling-circuit, of a plurality of electromagnetic windings associated therewith, means for altering the voltage and direction of the current upon said circuit to operate said windings selectively, and means actuated by said windings to control the current upon a suitable supply-circuit.

16. The combination with a suitable controlling-circuit, of a plurality of electromagnetic windings associated therewith, means for altering the voltage and direction of the current upon said circuit to operate said windings selectively, and the elements of an electric-motor controller adapted to be actuated by said windings.

17. The combination with a suitable controlling-circuit, of a reversing-switch connected therewith and controlled by reversing the direction of the current upon said circuit, means for changing the direction of the current upon said circuit, and other switches connected with said circuit and controlled by variation in the voltage impressed upon said circuit.

18. The combination with a suitable controlling-circuit, of means for varying at will the voltage impressed thereon, a plurality of magnetic windings associated therewith and responding to variation of voltage, and a reversing-switch and an armature resistance controlled by said windings.

19. The combination with a suitable controlling-circuit, of a plurality of electromagnetic windings connected therewith and responding to variations in voltage, an armature resistance controlled by said windings, a reversing-switch also connected with said circuit and controlled by the direction of the current upon said circuit, and means for varying the voltage and polarity of the current upon said circuit.

20. The combination with a suitable controlling-circuit, of means for varying at will the voltage impressed thereon, a plurality of electromagnetic windings associated therewith responding to variation of voltage, a reversing-switch controlled by a pair of said windings and an armature resistance controlled by a plurality of said windings.

21. The combination with a suitable controlling-circuit, of means for varying at will the voltage impressed thereon, a plurality of electromagnetic windings associated therewith and responding to variation of voltage, a reversing-switch controlled by windings actuated at a low voltage, and an armature resistance controlled by windings adapted to be successively energized as the voltage is increased.

22. The combination with a suitable controlling-circuit, of a plurality of electromagnetic windings connected therewith and adapted to respond to variations of voltage, a dynamo-electric generator for supplying current to said circuit, and means for varying the voltage developed by said generator.

23. The combination with a suitable controlling-circuit, of a plurality of electromagnetic windings connected in parallel with said circuit and adapted to respond to variations in voltage, a generator for supplying current to said circuit, and means for varying the voltage impressed by said generator.

24. The combination with a suitable controlling-circuit, of a plurality of electromagnetic windings connected therewith and adapted to respond to variations of voltage, a dynamo-electric generator for supplying current to said circuit, means for varying the voltage developed by said generator, and suitable instrumentalities controlled by said windings.

25. The combination with a suitable controlling-circuit, of a plurality of electromagnetic windings connected therewith and adapted to respond to variations of voltage, a dynamo-electric generator for supplying current to said circuit, means for varying the voltage developed by said generator, and the elements of an electric-motor controller adapted to be controlled by said windings.

26. The combination with a suitable controlling-circuit, of a dynamo-electric generator for supplying current thereto, means for altering the voltage and direction of the current generated by said generator, and a plurality of electromagnetic windings connected with said circuit and adapted to respond selectively according to the voltage and direction of the current upon said circuit.

27. The combination with a suitable controlling-circuit, of a dynamo-electric generator for supplying current thereto, means for altering the voltage and direction of the current generated by said generator, a plurality of electromagnetic windings connected with said circuit and adapted to respond selectively according to the voltage and direction of the current upon said circuit, and suitable instrumentalities controlled by said windings.

28. The combination with a suitable controlling-circuit, of a generator for supplying current thereto, means for altering the voltage and direction of the current generated by said generator, a plurality of electromagnetic windings connected with said circuit and adapted to respond selectively according to the voltage and direction of the current upon said circuit, and the elements of an electric-motor controller adapted to be controlled by said windings.

29. The combination with a suitable controlling-circuit, of a plurality of electromagnetic windings connected therewith and adapted to respond to variations of voltage, a dynamo-electric generator supplying current to said circuit, and a rheostat for varying the field of said generator.

30. The combination with a suitable controlling-circuit, of a plurality of electromagnetic windings connected therewith and adapted to respond to variations of voltage, a dynamo-electric generator supplying current to said circuit, a rheostat for varying the field of said generator, and the elements of an electric-motor controller arranged to be actuated by said windings.

31. The combination with a suitable supply-circuit, of a motor-generator having the motor part thereof energized from said supply-circuit, a controlling-circuit connected with the generator part of said motor-generator, means for varying the voltage developed by said generator part and a plurality of electromagnetic windings associated with said controlling-circuit and adapted to respond to variation of voltage.

32. The combination with a suitable supply-circuit, of a motor-generator having the motor part thereof energized from said supply-circuit, a controlling-circuit connected with the generator part of said motor-generator, means for varying the voltage developed by said generator part and a plurality of electromagnetic windings associated with said controlling-circuit and adapted to respond to variation of voltage, and suitable instrumentalities controlled by said windings.

33. The combination with a suitable supply-circuit, of a motor-generator having the motor part thereof energized from said supply-circuit, a controlling-circuit connected with the generator part of said motor-generator, means for varying the voltage developed by said generator part, and a plurality of electromagnetic windings associated with said controlling-circuit and adapted to respond to variation of voltage, and the elements of a motor-controller adapted to be controlled by said windings.

34. The combination with a supply-circuit, of a motor-generator having the motor part thereof energized from said supply-circuit, a controlling-circuit connected with the armature of the generator part of said motor-generator, suitable means for varying at will the voltage developed by said armature, and a plurality of electromagnetic windings associated with said controlling-circuit and responding to different voltages.

35. The combination with a supply-circuit, of a motor-generator having the motor part energized by said circuit, a controlling-circuit connected with the armature of the generator part thereof, means for varying at will the strength of the field of said generator part, and a plurality of electromagnetic windings associated with said controlling-circuit and responding to different voltages.

36. The combination with a supply-circuit, of a motor-generator, having the motor part thereof energized by said circuit, a controlling-circuit connected with the armature of the generator part of said motor-generator, means for varying at will the voltage developed by said armature, a plurality of electromagnetic windings associated with said controlling-circuit and responding to variation of voltage, a reversing-switch and an armature resistance controlled by said windings.

37. A supply-circuit, a motor-generator operated therefrom, a controlling-circuit connected with the generator part thereof, means for reversing the polarity of said controlling-circuit, and a switch having two windings, one connected with said controlling-circuit and the other connected with the said supply-circuit.

38. A supply-circuit, a motor-generator energized thereby, a controlling-circuit connected with the generator part thereof, means for reversing the polarity of said controlling-circuit, and a reversing-switch having two solenoids, each having two windings, one winding of each solenoid being connected with said controlling-circuit and the other winding of each solenoid being connected with said supply-circuit.

39. A supply-circuit, a motor-generator connected therewith, a controlling-circuit connected with said motor-generator, means for varying the voltage impressed upon said controlling-circuit and for reversing the polarity thereof, a plurality of electromagnetic windings connected with said controlling-circuit and responding to different voltages, a reversing-switch adapted to be operated by the reversal of the polarity of said working circuit, and the elements of a motor-controller adapted to be operated by the other of said windings as the voltage of the controlling-circuit is varied.

40. A supply-circuit, a motor-generator connected therewith, a controlling-circuit connected with the said motor-generator, means for varying the voltage of said controlling-circuit and for reversing the polarity thereof, a plurality of electromagnetic windings connected with said controlling-circuit adapted to respond to variation of voltage, an armature resistance controlled by a portion of said windings, a reversing-switch controlled by another portion of said windings, and an electric motor associated with said armature resistance and reversing-switch.

41. A supply-circuit, a motor-generator supplied therefrom, a controlling-circuit connected with the armature of said motor-generator, a master-controller for controlling the voltage of said armature, and a plurality of solenoids connected with said controlling-circuit and responding to changes of voltage.

42. A supply-circuit, a motor-generator supplied therefrom, a controlling-circuit connected with the armature of the generator part thereof, a master-controller for varying the strength of the field of said generator part, and a plurality of electromagnetic windings responding to variations of said voltage.

43. An electric-vehicle controller comprising a supply-circuit, a motor-generator supplied therefrom, a controlling-circuit supplied by the armature of the generator part thereof, a pair of master-controllers, one at each end of said vehicle, for controlling the voltage developed by said armature, and a plurality of electromagnetic windings connected with said controlling-circuit and responding to variations of voltage thereon.

44. The combination with a controlling-circuit, of means for varying the voltage thereon without thereby altering the resistance of said controlling-circuit, a plurality of electromagnetic windings associated therewith, and responding to variation of voltage thereon, a plurality of electric motors, a series-parallel switch associated therewith, one of said windings controlling the series switch, and another of said windings controlling the parallel switch.

45. The combination with a controlling-circuit, of means for varying the voltage thereon, a plurality of electromagnetic windings associated therewith and responding to variation of voltage thereon, a plurality of electric motors, a series-parallel switch associated therewith, one of said windings responding to a lower voltage and controlling the series switch, and another of said windings responding to a higher voltage and controlling the parallel switch.

46. The combination of a controlling-circuit, means for varying the voltage thereon, a plurality of electromagnetic windings associated therewith and responding to variation of voltage, a plurality of electric motors, a series-parallel switch, one of said windings controlling said series switch and responding to a lower voltage, another of said windings controlling said parallel switch and responding to a higher voltage and means whereby the energizing of the winding of the parallel switch deënergizes the winding of the series switch.

47. A controlling-circuit, means for varying the voltage thereon, a plurality of electromagnetic windings associated therewith and responding to variation of voltage, a plurality of electric motors, a series-parallel switch, one of said windings controlling the series switch and responding to a lower voltage, another of said windings controlling the parallel switch and responding to a higher voltage thereon, other of said windings controlling the armature resistances, said parallel switch when actuated serving to deënergize the series-switch winding and the armature-resistance windings.

48. A controlling-circuit, means for varying the voltage thereon, a plurality of electromagnetic windings associated therewith and responding to variation of voltage, a plurality of electric motors, a series-parallel switch therefor, one of said windings controlling the series switch and responding to a lower voltage, another of said windings controlling the parallel switch and responding to a higher voltage, armature resistances controlled by other of said windings and responding to different voltages and means whereby said parallel-switch winding when energized serves to deenergize said series-switch winding and said resistance-controlling windings, and a resistance adapted to be inserted in the circuits of said resistance-controlling windings whereby further increase of the voltage is necessary to again actuate said resistance-controlling windings to remove the resistances from the armature-circuits.

49. A supply-circuit, a controlling-circuit, means for reversing the polarity of the controlling-circuit, a reversing-switch having a plurality of solenoids, each having a pair of windings, one winding of each pair being connected with the controlling-circuit and the other winding of each pair being connected with the supply-circuit, said windings being arranged so that the reversal of the polarity on the controlling-circuit will alternately energize said solenoids.

50. A supply-circuit, a controlling-circuit, means for reversing the polarity of the controlling-circuit, a reversing-switch having two solenoids, each having a pair of windings, one winding of each pair being connected with the controlling-circuit and the other winding of each pair being connected with the supply-circuit, said windings being arranged so that the reversal of the polarity on the controlling-circuit will alternately energize said solenoids, and interlocking mechanism between the movable parts of said solenoids whereby the switch-contacts of both solenoids cannot be closed in unison.

51. A controlling-circuit, means for varying the voltage thereon, a series-parallel switch comprising two windings connected with said circuit and responding to different voltages and interlocking means between the movable elements actuated by said windings whereby but one of said movable parts can be thrown into operation at a time.

52. A controlling-circuit, means for varying the voltage thereon, a series-parallel switch comprising two windings connected with said circuit and responding to different voltages and interlocking means between the movable elements actuated by said windings whereby but one of said movable parts can be thrown into operation at a time, said interlocking mechanism permitting sufficient freedom of movement so that the winding of the parallel switch when energized will serve to deenergize the winding of the series switch.

53. The combination with a plurality of electric vehicles adapted to be connected together in a train, of a train-circuit adapted to extend throughout the several vehicles, a controlling-circuit upon each car, means at one car operating through the agency of said train-circuit for varying the voltage upon the several controlling-circuits, and motor-controlling mechanism responding to variation of voltage on the working circuits.

54. The combination with a plurality of electric vehicles adapted to be connected together in a train, of a train-circuit extending through said several vehicles, a controlling-circuit on each vehicle, means upon each of a plurality of said vehicles for varying the voltage upon said several controlling-circuits and suitable instrumentalities associated with said controlling-circuit and responding to variation of voltage for controlling the electric motors upon the several cars.

55. A plurality of electric vehicles adapted to be connected together in a train, a train-circuit extending through said vehicles, a controlling-circuit on each vehicle, a supply-circuit on each of a plurality of said vehicles, a motor-generator on each of a plurality of said vehicles, means whereby any one of said motor-generators may be operated from the main supply-circuit, means whereby all of said controlling-circuits may be connected with the generator-armature of any one of said motor-generators, and means for varying the voltage delivered by any of the said generator-armatures, and instrumentalities associated with said controlling-circuits responding to variations of voltage and adapted to control the electric motors.

56. The combination with a suitable supply-circuit, of a controlling-circuit, a plurality of electromagnetic windings adapted to respond to variations of voltage and connected with said controlling-circuit, means for transforming current from said supply-circuit into a modified current as to voltage and polarity upon said controlling-circuit to operate said windings selectively.

57. The combination with a suitable supply-circuit, of a controlling-circuit, a plurality of electromagnetic windings adapted to respond to variations of voltage and connected with said controlling-circuit, means for transforming current from said supply-circuit into a modified current as to voltage and polarity upon said controlling-circuit to operate said windings selectively, and suitable instrumentalities controlled by said windings.

58. The combination with a suitable supply-circuit, of a controlling-circuit, a plurality of electromagnetic windings adapted to respond to variations of voltage and connected with said controlling-circuit, means for transforming current from said supply-circuit into a modified current as to voltage and polarity upon said controlling-circuit to operate said windings selectively, and the elements of an electric motor-controller adapted to be controlled by said windings.

59. A controlling-circuit, means for varying the voltage thereon, a plurality of electromagnetic windings associated therewith and responding to variation of voltage, and means for automatically inserting a resistance in circuit with a winding responding to a lower voltage to protect the same when the voltage rises.

60. A controlling-circuit, means for varying the voltage thereon, a plurality of electromagnetic windings associated therewith and responding to varying voltages, and means for inserting a resistance in series with the winding responding to a lower voltage, when the said winding is energized, to thereby protect the winding against the flow of an excessive current when the voltage is increased.

61. In a motor-controlling mechanism, the combination with one or more driving-motors, of a supply-circuit with which said motors are directly connected to receive current therefrom, a controlling-circuit, means for making the operation of said motors dependent upon the direction of the current-flow in the controlling-circuit, and means controlling the strength of the current supplied to said motors.

62. In a motor-controlling mechanism, the combination with one or more motors, of a supply-circuit having said motors connected therewith, a controlling-circuit, means connected with said controlling-circuit and adapted to change the direction of operation of said motor by reversing the direction of the current upon said controlling-circuit, and means controlling the strength of the current supplied to said motors.

63. The combination with a suitable supply-circuit having a constant direction, of a motor connected therewith, a switch for reversing the direction of the current through the motor, a controlling-circuit having means connected therewith to actuate said switch by reversing the direction of the current upon said controlling-circuit, means for varying at will the direction of the current upon said controlling-circuit, and means controlling the strength of the current supplied to said motors.

64. In a motor-controlling mechanism, the combination with one or more motors, of a supply-circuit having said motors connected therewith, a controlling-circuit, a reversing-switch for said motors, electromagnetic windings connected with said controlling-circuit and adapted to actuate said reversing-switch by reversing the direction of the current upon said controlling-circuit, and means controlling the strength of the current supplied to said motors.

65. In a motor-controlling mechanism, the combination with one or more driving-motors, of a supply-circuit therefor, a reversing-switch, a controlling-circuit, electromagnetic windings suitably connected with said controlling-circuit and adapted to operate said switch by reversing the direction of the current upon said controlling-circuit, means for controlling the direction of the current upon said controlling-circuit, and means for controlling the strength of the current supplied to said motors.

66. In a motor-controlling mechanism, the combination with one or more driving-motors, of a supply-circuit having said motors connected therewith, a controlling-circuit, means connected with said controlling-circuit and adapted to change the direction of the operation of said motors by reversing the direction of the current upon said controlling-circuit, and means operating under variation of voltage upon said controlling-circuit to vary the strength of the current supplied to said motors.

67. In a motor-controlling mechanism, the combination of a plurality of motors, a supply-circuit, a control-circuit, means for making the operative direction of said motors dependent on the direction of the current-flow in the controlling-circuit, and means for throwing the motors into various operating relations with the supply-circuits dependent upon the voltages impressed on said controlling-circuit, substantially as described.

68. The combination with a suitable controlling-circuit, of a plurality of magnetic windings connected therewith and adapted to respectively respond to currents of different strenth, and means for varying at will the strength of the current impressed upon said controlling-circuit, without thereby altering the resistance of said controlling-circuit, substantially as described.

69. The combination with a suitable supply-circuit, of a controlling-circuit having a source of supply independent of said supply-circuit, a plurality of electromagnetic windings connected with said controlling-circuit and adapted to respond to variations of voltage, and means for varying at will the voltage impressed upon said controlling-circuit.

70. The combination with a suitable supply-circuit, of a controlling-circuit having a source of supply independent of said supply-circuit, a plurality of electromagnetic windings connected with said controlling-circuit in parallel and adapted to respond to variations of voltage, and means for varying at will the voltage impressed upon said controlling-circuit.

71. The combination with a suitable supply-circuit, of a controlling-circuit having a source of supply independent of said supply-circuit, a plurality of electromagnetic windings connected with said controlling-circuit and adapted to respond to variations of voltage, means for varying at will the voltage impressed upon said controlling-circuit, and suitable instrumentalities controlled by said electromagnetic windings.

72. The combination with a suitable supply-circuit, of one or more electric motors connected with said supply-circuit, a controlling-circuit having a source of supply independent of said supply-circuit, a plurality of electromagnetic windings connected with said controlling-circuit and adapted to respond to variations of voltage, means for varying at will the voltage impressed upon said controlling-circuit, and the elements of an electric-motor controller adapted to be actuated by said windings.

73. The combination with a suitable supply-circuit, of one or more electric motors connected therewith, a controlling-circuit having a source of supply independent of said supply-circuit, a plurality of electromagnetic windings connected with said controlling-circuit and adapted to respond to variations of voltage, means for varying at will the voltage impressed upon said controlling-circuit, and an armature resistance and a reversing-switch for said motor controlled by said windings.

74. The combination with a supply-circuit, of a controlling-circuit having a source of supply independent of said supply-circuit, a plurality of electromagnetic windings connected with said controlling-circuit and adapted to respond to variations of voltage, and means for varying the voltage and polarity of the current upon said controlling-circuit to actuate said windings selectively.

75. The combination with a supply-circuit, of a controlling-circuit having a source of supply independent of said supply-circuit, a plurality of electromagnetic windings connected with said controlling-circuit and adapted to respond to variations of voltage, means for varying the voltage and polarity of the current upon said controlling-circuit to actuate said windings selectively, and suitable instrumentalities adapted to be controlled by said windings.

76. The combination with a supply-circuit, of one or more electric motors connected therewith, a controlling-circuit having a source of supply independent of said supply-circuit, a plurality of electromagnetic windings connected with said controlling-circuit and adapted to respond to variations of voltage, means for varying the voltage and polarity of the current upon said controlling-circuit to actuate said windings selectively, and the elements of an electric-motor controller adapted to be controlled by said windings.

77. The combination with a suitable supply-circuit, of one or more electric motors connected therewith, a controlling-circuit, and means connected with said controlling-circuit for controlling the strength and direction of the current supplied to said motor.

78. The combination with a suitable supply-circuit, of one or more electric motors connected therewith, a controlling-circuit, means connected with said controlling-circuit for controlling the strength and direction of the current supplied to said motor, and means for altering the strength and polarity of the current on said controlling-circuit to actuate the first-mentioned means.

79. The combination with a suitable supply-circuit, of one or more electric motors connected therewith, a controlling-circuit, a plurality of electromagnetic windings connected with said controlling-circuit and adapted to respond selectively according to the voltage and direction of the current upon said controlling-circuit, a reversing-switch and a resistance-switch adapted to be actuated by said windings, and means for varying the strength and polarity of the current upon said controlling-circuit.

80. The combination with a train of cars or vehicles, of a controlling-circuit extending through said train, a plurality of electromagnetic windings arranged in each of said cars and connected with said controlling-circuit, said windings being adapted to respond to variations of voltage, and means for varying at will the voltage impressed upon said controlling-circuit without thereby altering the resistance thereof.

81. The combination with a suitable supply-circuit, of one or more electric motors connected therewith, a controlling-circuit, a plurality of electromagnetic windings connected with said controlling-circuit and adapted to respond selectively according to the voltage and direction of the current upon said controlling-circuit, means for varying the strength and polarity of the current upon said controlling-circuit, and suitable instrumentalities controlled by said windings.

82. The combination with a suitable supply-circuit, of one or more electric motors connected therewith, a controlling-circuit, a plurality of electromagnetic windings connected with said controlling-circuit and adapted to respond selectively according to the voltage and direction of the current upon said controlling-circuit, means for varying the strength and polarity of the current upon said controlling-circuit, and the elements of electric-motor controllers controlled by said windings.

83. The combination with a train of cars or vehicles, of a controlling-circuit extending through said train, a plurality of electromagnetic windings arranged in each of said cars and connected with said controlling-circuit, said windings being adapted to respond to variations of voltage, a suitable supply-circuit, suitable driving-motors connected with said supply-circuit, elements for controlling the operation of said motors and adapted to be actuated by said windings, and means for varying at will the voltage impressed upon said controlling-circuit without thereby altering the resistance thereof.

84. The combination with a train of electric cars or vehicles, of suitable propelling-motors therefor, a supply-circuit having said motors connected therewith, a controlling-circuit extending through said train, a plurality of electromagnetic windings arranged in each of said cars and connected with said controlling-circuit, said windings being adapted to respond to variations in voltage, a source of supply for said controlling-circuit independent of said supply-circuit, means for varying the voltage impressed upon said controlling-circuit, and the elements of electric-motor controllers adapted to be actuated by said windings.

85. The combination with a train of electric cars or vehicles, of suitable motors for propelling said vehicles, a supply-circuit having said motors connected therewith, a controlling-circuit extending through said train, a plurality of electromagnetic windings arranged in each of said cars and connected with said controlling-circuit, said windings being adapted to respond selectively according to the voltage and direction of the current upon said controlling-circuit, the elements of an electric-motor controller arranged upon each car and adapted to be actuated by said windings, and means for varying at will the voltage and polarity of the current upon said controlling-circuit.

86. In a motor-controlling mechanism, the combination with one or more electric motors, of a single controlling-circuit, comprising two conductors leading from the source of supply, and means connected with said conductors adapted to control the direction and speed of operation of said motors and operated by changing the electric conditions existing upon said controlling-circuit.

87. In a motor-controlling mechanism, the combination with one or more electric motors, of a single controlling-circuit, comprising two conductors leading from the source of supply, means for controlling both the direction and speed of operation of said motors by altering the voltage and polarity of the current upon said controlling-circuit, and means for varying at will the voltage and polarity of the current upon said controlling-circuit.

In witness whereof I have hereunto subscribed my name in the presence of two witnesses.

HENRY H. CUTLER.

Witnesses:
W. CLYDE JONES,
E. E. JONES.